(No Model.) 2 Sheets—Sheet 1.
R. C. SMITH.
CAR STARTER.
No. 244,680. Patented July 19, 1881.
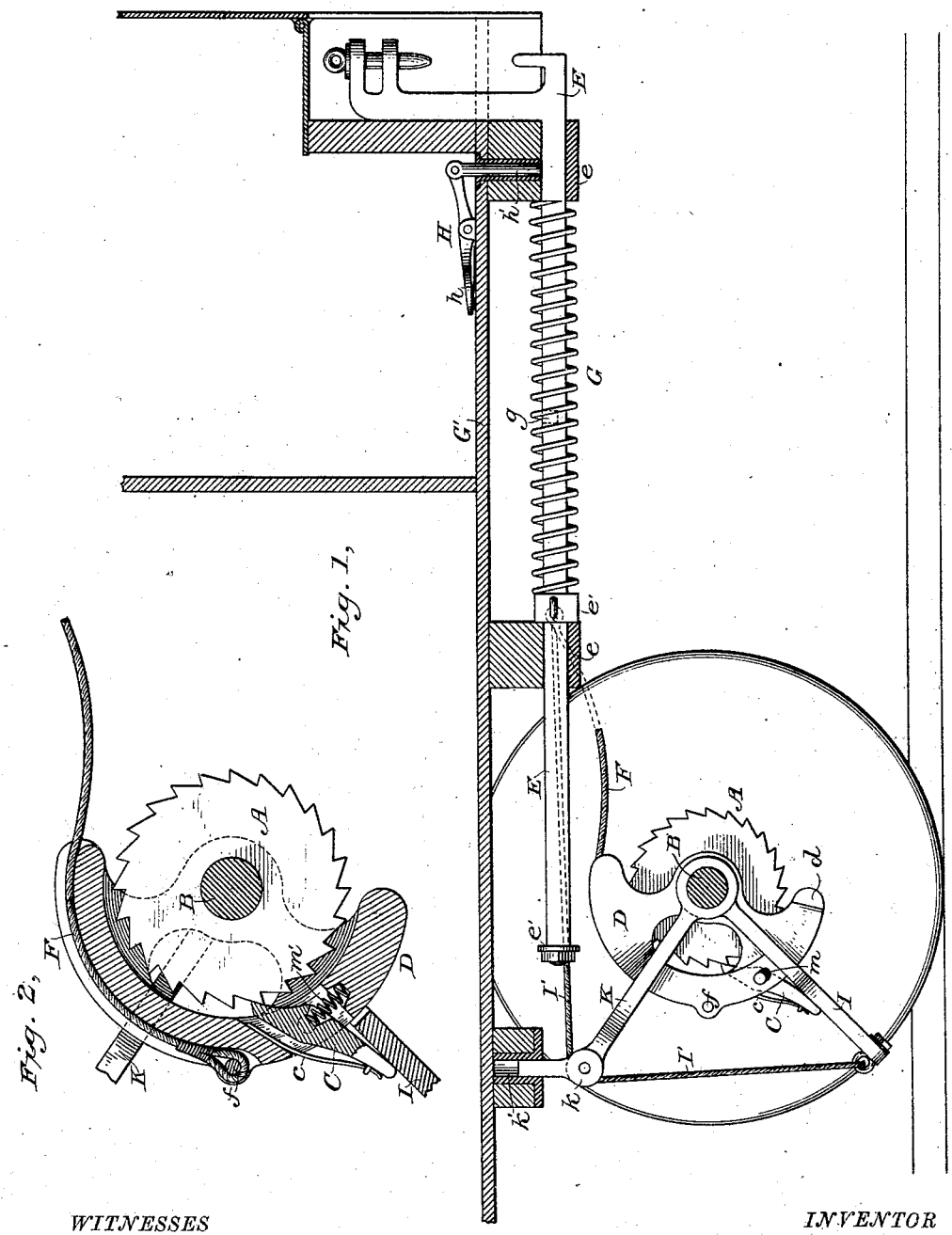

(No Model.) 2 Sheets—Sheet 2.
R. C. SMITH.
CAR STARTER.
No. 244,680. Patented July 19, 1881.
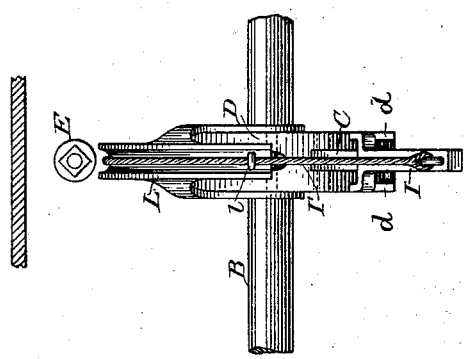
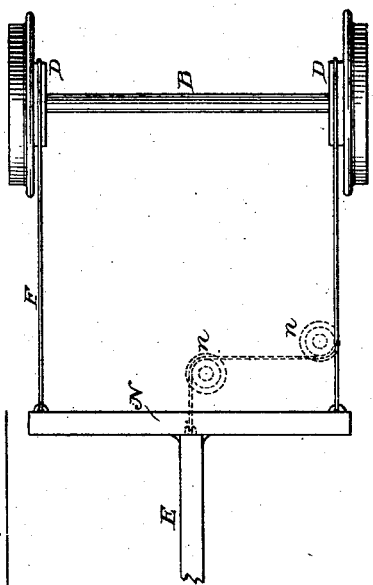
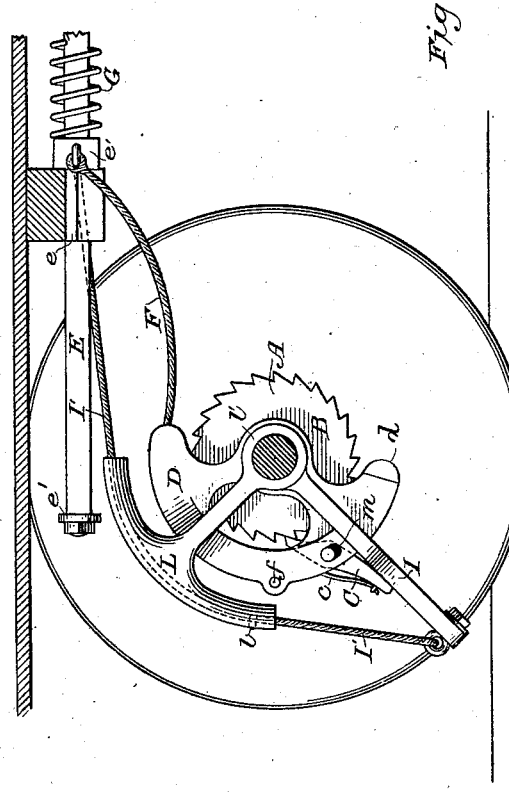
INVENTOR
Richards C. Smith,

# UNITED STATES PATENT OFFICE.

RICHARDS C. SMITH, OF BALTIMORE, MARYLAND.

CAR-STARTER.

SPECIFICATION forming part of Letters Patent No. 244,680, dated July 19, 1881.

Application filed May 27, 1881. (No model.)

*To all whom it may concern:*

Be it known that I, RICHARDS C. SMITH, of Baltimore city, in the State of Maryland, have invented certain new and useful Improvements in Car-Starters, of which the following is a specification.

My invention relates to improvements in devices for assisting teams in starting heavy or heavily-loaded vehicles, particularly street-cars, and especially pertains to that class of starting devices in which the draft-strains are exerted upon the axles or wheels of the vehicles in such way as to materially lessen the labor of the draft-animals in overcoming inertia and enable them quickly to get in motion.

My object mainly is to afford the fullest assistance to the team at first in starting, to enable the animals to give a slow motion to the car, &c., with the least strain, and, after so overcoming initial inertia, to increase this motion without necessitating an increase of speed of the team, and while still affording assistance to prevent overtaxing the strength of the animals.

Mechanism by which to enable the team readily to start the car in motion gradually or step by step, together with co-operating or auxiliary mechanism, will hereinafter fully be described, preparatory to a specific designation of the organization of devices and combinations of parts claimed as my invention.

In the accompanying drawings, which show so much only of an ordinary horse-car as is deemed requisite to a proper illustration of my improvements, I have shown a preferred construction, together with modifications of my invention.

Figure 1:
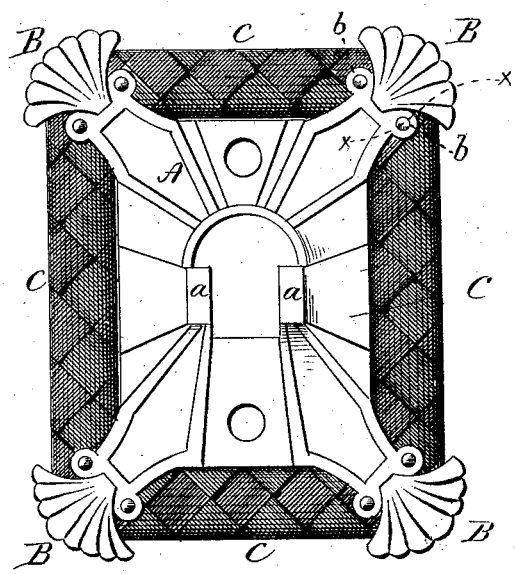
Figure 2:

Figure 1 is a longitudinal vertical section, showing a portion of the frame-work of a car and one of the wheels and axles with my improvements applied. Fig. 2 is a vertical section, showing on an enlarged scale the axle-attached ratchet, the oscillating pawl-carrier, &c. Figs. 3 and 4 are views respectively showing a side elevation and a rear elevation of a slightly-modified form of apparatus. Fig. 5 is a plan view, designed to show an appropriate arrangement of the ratchets, pawls, &c., close to the wheels instead of at the center of the axle.

As usual in car-starters of the type, generally speaking, to which my improvements pertain, a ratchet-wheel, A, fastened to the axle B, is engaged by a pawl, C, of an oscillating frame or pawl-carrier, D, rocking loosely on the axle. The team is hitched to a draw-bar, E, connected with the pawl-carrier by a rope or chain, F. Broadly considered, or in general features of construction and mode of operation, the above-specified parts need no detailed description.

The draw-bar E slides endwise in suitable guideways, $e\, e$, shown as formed in cross-beams of the car-bottom, and is limited in its play by suitable stops or collars, as those $e'\, e'$, which are adapted to abut against one of said beams. A spring, G, of the draw-bar bears at opposite ends against the front guideway, $e$, and the foremost collar, $e'$, and acts constantly with a tendency either to move the draw-bar into the position in which it is represented in the drawings or hold it in such position. A lever or treadle, H, upon the platform G', convenient to the foot of the driver, is acted upon by a spring, $h$, to cause a pivoted arm or rod, $h'$, to engage a seat or notch, $g$, in the draw-bar when this bar is drawn out. The driver may at will release the draw-bar by pressing upon the lever, and so enable the spring to return this bar to the position in which it is represented by the drawings, provided the team is properly managed or no draft-strain exerted on the draw-bar. By locating the spring G between the draw-bar supports or guideways, as shown, I am enabled to employ a spring of ample length to possess the requisite amount of play or proper degree of resiliency without weakening or unduly straining it, and am also enabled to arrange the draw-bar-engaging rod or vertically-reciprocating locking-arm of the treadle in advance of the spring to act directly upon the draw-bar.

The oscillating pawl-carrier D is suitably weighted or counterbalanced, so that if elevated it will drop from the upward position into that in which it is shown by the drawings when free to do so by the backward movement of the draw-bar and consequent slackening of the rope or chain F, which is fastened at $f$ to the pawl-carrier and connects with the horizontally-reciprocating draw-bar in advance of its rearmost support, e, as clearly shown in the drawings. When the pawl-carrier is in the upward position the spring c of the pawl acts upon its heel end in such a way as to rock the nose of the pawl out of contact with the ratchet-wheel, so preventing wear and noise.

A lever, I, of a length greater than that of the radius of the pawl-carrier, is pivoted or loosely fulcrumed on the axle B, and connected at its outer weighted or counterbalanced end by a chain or rope, I', with the draw-bar E. In Fig. 1 of the drawings this rope I' is shown as passing around a support intermediate the lever and draw-bar, which consists of a pulley, k, supported in an inclined braced frame or standard, K, which at its lower end is sustained by the axle B, while at its upper end it works freely up and down in and is firmly held by a seat or socket, k', in a frame-beam, K', of the car-bottom. By thus supporting the pulley-carrying frame it is not cramped by the variations in the level of the car-bottom occurring constantly by the rise and fall of its springs as the load upon them is varied. As shown by Figs. 3 and 4, a rocking segment-support or oscillating arc, L, is substituted for the braced frame K and pulley-support, thus rendering a connection with the car-bottom unnecessary. The rope or chain I' is connected at l with the segment which rocks about the axle by means of its sleeve l'.

When the parts are in position, ready to be operated, the heel of the pawl C rests upon the lever I, and the weight of the pawl-carrier is sufficient to partly overcome the force of the spring c, and so bear the pawl-heel against the lever to such an extent as to cause the pawl-nose to enter somewhat between the ratchet-teeth. The pawl, it should be noticed, is pivoted in elongated slots m in the pawl-carrier, and is acted upon by a thrust-spring, m', the tendency of which spring is to keep the pawl-pivot bearing against the upper ends of the slots in the two sides of the pawl-carrier.

The relative lengths of the chains or ropes E and I' are such that the former is slack, as shown, when the draft-strain is first exerted to start the car, and this strain is therefore primarily brought to bear with the fullest force or greatest amount of leverage by way of the draw-bar, the rope I', segment L, (or pulley k,) lever I, and pawl-ratchet. The initial inertia or greatest resistance being overcome and the slack of the chain F taken up, the draft-strain is transferred direct to the pawl-carrier with increased speed in the motion of the car and proportionately-decreased leverage or assistance to the team and the chain I' slacks. By the time the draw-bar has been drawn out to its limit and there automatically engaged by the treadle, &c., the car will have been given sufficient momentum to enable the team to continue in motion by drawing direct upon the car, or unaided, without injurious strain.

In starting it will be seen that the lever I, in striking against the pawl-heel and rocking the pawl-nose into full clutch with the ratchet-wheel, will compress the spring m', the yielding of which spring and consequent movement of the pawl-pivot in the guide-slots greatly facilitating the proper engagement of the parts and lessening the frictional contact or grinding and thrusting action of the pawl-nose against the shoulder of the tooth with which it engages. When the draw-bar is relieved of the draft-strain and released by operating the locking-lever the spring slides the draw-bar backward, being assisted by the weighted lever I and rocking pawl-carrier acting upon the draw-bar by the chains. At the first part of the backward rocking movement of the carrier the lever bears upon the side shoulders, d d, of the carrier, and the completion of the movement of the carrier is due to its own weight.

The modification shown by Fig. 5, in which figure such parts only are represented as are deemed necessary to illustrate the change made, is mainly designed for employment in connection with cars in the construction of which there is not provided sufficient space for the attachment of the starting apparatus at the centers of the axles. In such cases the spaces beneath the seats are utilized. The cross-bar N, connected with the draw-bar, may, if necessary or preferable, be arranged nearer the ground or at a lower level than the rocking pawl-carriers D. The pulleys n n (represented in dotted lines in Fig. 5) suffice to show how one pawl-carrier D and co-operating devices might be employed and the cross-bar N dispensed with.

My improvements are, of course, to be duplicated in attachments to double-ender cars, each axle of such a car having the ratchet-wheel, pawl-carrier, &c., and connections with spring-actuated draw-bars, the rear draw-bar of the car being locked in its outward position for obvious reasons.

Obviously some of my improvements may be used without the others, and the details of construction of essential features be altered in some respects without departure from my invention. For instance, the lever I, rope I', &c., might be omitted in very light cars, while still retaining the advantages due to the employment of my peculiar spring-actuated draw-bar and direct-acting locking-lever for holding it in its outward position. In such event the pawl would have to be engaged with the ratchet in some other way than by the lever I—as, for instance, by counterbalancing the pawl so that it would automatically engage and disengage with the ratchet when in its lowermost and uppermost positions, respectively; or a cord might be passed from the draw-bar to the pawl-heel and be made of such length that upon the first part of the outward movement of the draw-bar such cord would cause engagement of the pawl-nose with the ratchet, the chain F being made of such length that (No Model.)

W. M. SMITH.
COFFIN HANDLE SOCKET.

No. 244,681. Patented July 19, 1881.

Witnesses.

Wm. M. Smith
Inventor,
By atty.